(12) United States Patent  (10) Patent No.: US 9,189,590 B2
Fan  (45) Date of Patent: Nov. 17, 2015

(54) METHOD AND DEVICE FOR EXAMINING QUALITY OF DUMMY PATTERN INSERTION PROGRAM USED IN CIRCUIT LAYOUT DESIGN

(71) Applicant: Semiconductor Manufacturing International (Shanghai) Corporation, Shanghai (CN)

(72) Inventor: Qiang Fan, Shanghai (CN)

(73) Assignee: SEMICONDUCTOR MANUFACTURING INTERNATIONAL (SHANGHAI) CORPORATION (CN)

( * ) Notice: Subject to any disclaimer, the term of this patent is extended or adjusted under 35 U.S.C. 154(b) by 0 days.

(21) Appl. No.: 14/445,700

(22) Filed: Jul. 29, 2014

(65) Prior Publication Data

US 2015/0186593 A1    Jul. 2, 2015

(30) Foreign Application Priority Data

Dec. 30, 2013  (CN) .......................... 2013 1 0746362

(51) Int. Cl.
  *G06F 17/50*  (2006.01)
(52) U.S. Cl.
  CPC ................. *G06F 17/5081* (2013.01)

(58) Field of Classification Search
  CPC ............ G06F 17/5081; G06F 17/5068; G06F 17/5036; G06F 17/5022; G06F 17/5077; G03F 1/144; G03F 1/36; G03F 7/705
  USPC .......................................... 716/32, 55, 112, 2
  See application file for complete search history.

(56) References Cited

U.S. PATENT DOCUMENTS

| | | | |
|---|---|---|---|
| 8,832,623 B1* | 9/2014 | Yuan et al. | 716/112 |
| 2007/0134921 A1* | 6/2007 | Tian et al. | 438/689 |
| 2010/0287520 A1* | 11/2010 | Nitta | 716/14 |
| 2013/0249106 A1* | 9/2013 | Lin et al. | 257/774 |

* cited by examiner

*Primary Examiner* — Vuthe Siek
(74) *Attorney, Agent, or Firm* — Innovation Counsel LLP

(57) ABSTRACT

A method for examining quality of a dummy pattern insertion program may be implemented using a device that includes hardware. The method may include using the dummy pattern insertion program to generate a dummy-based circuit layout, a first dummy-inserted circuit layout, and a second dummy-inserted circuit layout. The method may further include determining whether the dummy-based circuit layout complies with a set of circuit layout design rules. The method may further include checking whether the first dummy-inserted circuit layout complies with at least one of a set of dummy pattern check rules and a set of pattern density rules. The method may further include examining whether the second dummy-inserted circuit layout complies with at least one of the set of circuit layout design rules, the set of dummy pattern check rules, and the set of pattern density rules.

19 Claims, 5 Drawing Sheets

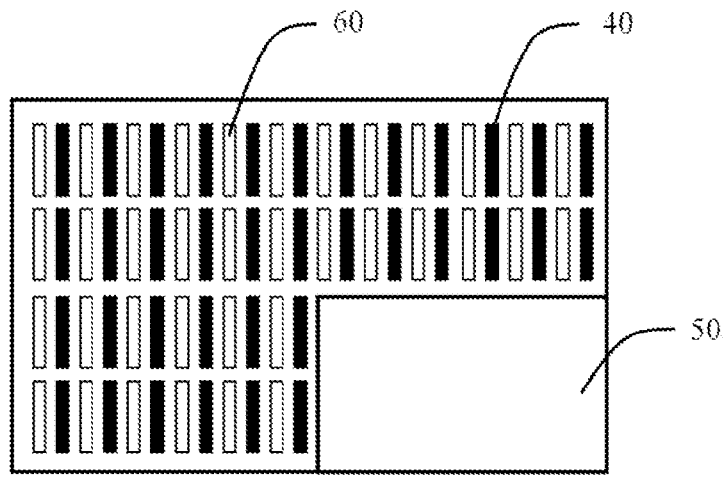
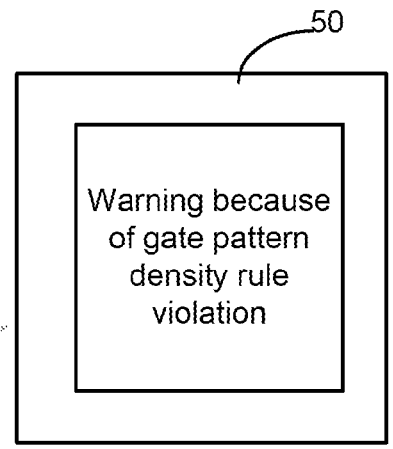
Fig. 6a    Fig. 6b
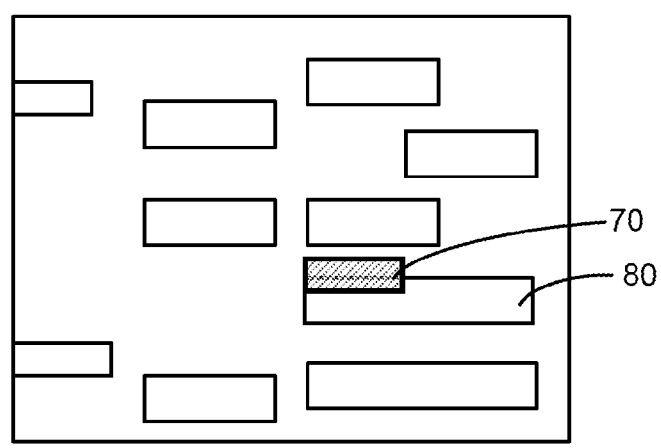
Fig. 6c

METHOD AND DEVICE FOR EXAMINING QUALITY OF DUMMY PATTERN INSERTION PROGRAM USED IN CIRCUIT LAYOUT DESIGN

CROSS-REFERENCE TO RELATED APPLICATION

This application claims priority to and benefit of Chinese Patent Application No. 201310746362.0, filed on 30 Dec. 2013, the Chinese Patent Application being incorporated herein by reference in its entirety.

BACKGROUND OF THE INVENTION

The present invention is related to a method and a device for examining quality of a dummy pattern insertion program that may be used in circuit (e.g., integrated circuit) and/or semiconductor device layout design.

For optimizing one or more of pattern density distribution, device performance uniformity, lithography, etching, chemical mechanical polishing (CMP), thermal anneal, stress, etc., in manufacturing a semiconductor device and/or integrated circuit, automatic dummy pattern insertion may be performed in a process of designing the layout of the semiconductor device using a dummy pattern insertion program (e.g., a script). Unsuitable dummy patterns in the layout of the semiconductor device may cause various issues, such as metal residual, device performance inconsistency, etc., in the manufacturing process. Therefore, quality of the dummy pattern insertion program may need to be examined.

Referring to FIG. 1, a method for examining the quality of a dummy pattern insertion program may include the following steps: designing or adjusting the dummy pattern insertion program, selecting a sample layout, using the dummy pattern insertion program to generate a dummy pattern according to the sample layout, inserting the dummy pattern into the sample layout to generate a dummy-inserted layout, and performing design rule check (DRC) on the dummy-inserted layout according to a set of design rules. If the dummy-inserted layout passes the design rule check, i.e., if the dummy-inserted layout complies with the design rules, then the dummy pattern insertion program may be approved for use in subsequent layout design processes. If the dummy-inserted layout fails the design rule check, then the dummy pattern insertion program may be adjusted (or updated). In general, the sample layout may not include sufficient (or comprehensive) reference layers. In addition, whether a dummy pattern design satisfies design rules may not be sufficiently checked. Therefore, even if a dummy pattern insertion program has been approved for use in layout design, the approved dummy pattern insertion program may generate and/or insert unsuitable dummy patterns. As a result, a layout that is designed using the approved dummy pattern insertion program may be defective.

SUMMARY

An embodiment of the present invention may be related to a method for examining quality of a dummy pattern insertion program. The method may be implemented using a device that includes hardware. The method may include using the dummy pattern insertion program to generate a dummy-based circuit layout. The method may further include determining whether the dummy-based circuit layout complies with a set of circuit layout design rules. The method may further include using the dummy pattern insertion program to generate a first dummy-inserted circuit layout. The method may further include checking whether the first dummy-inserted circuit layout complies with at least one of a set of dummy pattern check rules and a set of pattern density rules. The method may further include using the dummy pattern insertion program to generate a second dummy-inserted circuit layout. The method may further include examining whether the second dummy-inserted circuit layout complies with at least one of the set of circuit layout design rules, the set of dummy pattern check rules, and the set of pattern density rules.

The method may include the following step: checking whether the first dummy-inserted circuit layout complies with both of the set of dummy pattern check rules and the set of pattern density rules.

The method may include the following step: examining whether the second dummy-inserted circuit layout complies with all of the set of circuit layout design rules, the set of dummy pattern check rules, and the set of pattern density rules.

The method may include the following steps: using the dummy pattern insertion program to generate a first dummy pattern layout that includes a first set of dummy layer elements according to at least one of (e.g., both of) a first circuit layout and a set of dummy pattern rules; and converting a data type of the first dummy pattern layout to generate the dummy-based circuit layout.

The method may further include the following step: using the dummy pattern insertion program to insert the first dummy pattern layout into at least one of the first circuit layout and a second circuit layout to generate the first dummy-inserted circuit layout.

The method may further include the following steps: using the dummy pattern insertion program to generate a second dummy pattern layout that includes a second set of dummy pattern elements according to at least one of (e.g., both of) a relation-check circuit layout and the set of dummy pattern rules; and using the dummy pattern insertion program to insert the second dummy pattern layout into the relation-check circuit layout to generate the second dummy-inserted circuit layout. At least one of the aforementioned elements may represent a drawing element and/or a drawing layer.

The relation-check circuit layout may include a border layer unit, a set of reference layer units, and a set of initial dummy layer units. The border layer unit may encompass (and/or enclose) both of the set of reference layer units and the set of initial dummy layer units. The aforementioned units are rectangular block regions. For a border layer unit and a set of reference layer units, the units are totally coved by the corresponding drawing layers. For a set of initial dummy layer units, the initial dummy pattern of one dummy layer is filled inside of the corresponding dummy layer unit.

The set of reference layer units may include a first reference layer unit and a second reference layer unit. The set of initial dummy layer units may include a first initial dummy layer unit and a second initial dummy layer unit. The first reference layer unit may immediately neighbor a first edge of the border layer unit without any other reference layer unit being disposed between the first reference layer unit and the first edge of the border layer unit. The first initial dummy layer unit may immediately neighbor a second edge of the border layer unit without any other initial dummy layer unit being disposed between the first initial dummy layer unit and the second edge of the border layer unit. At least one of a length of a side of the first reference layer unit, a distance between the first reference layer unit and the second reference layer unit, a distance between the first reference layer unit and the first edge of the border layer unit, a length of a side of the first initial dummy layer unit, a distance between the first initial dummy layer unit and the second initial dummy layer unit, a distance between the first initial dummy layer unit and the second edge of the border layer unit, and a distance between the second reference layer unit and the second initial dummy layer unit may be in a range of 100 µm to 400 µm. In an embodiment, all of the above-mentioned lengths and distances may be in the range of 100 µm to 400 µm.

The set of initial dummy layer units may include at least one of a front-end-of-line process initial dummy layer unit, an inter-metal initial dummy layer unit, a first top metal initial dummy layer unit, a second top metal initial dummy layer unit, an extra-thick metal initial dummy layer unit, a metal bonding pad initial dummy layer unit.

The method may include the following steps for the dummy-based circuit layout: determining whether at least one of a width, a length, a space (and/or distance), and an area related to at least one dummy pattern element in a layer of the dummy-based circuit layout violates any of the circuit layout design rules; and determining whether at least one of enclosure, overlap, straddle, butting, intersection, interaction, a parallel length, and extension of two or more dummy pattern elements in different layers of the dummy-based circuit layout violates at least one of the circuit layout design rules.

The method may include the following steps for the first dummy-inserted circuit layout: examining whether at least one of space, contact, straddle, enclosure, blocking between auto inserted dummy pattern and drawing pattern or layer in the first dummy-inserted circuit layout violates any of the set of dummy pattern check rules. Examining whether at least one of physical mask layers density which combines one mask layer's drawing pattern and one mask layer's auto inserted dummy pattern together violated of any of the set of the mask layer's pattern density rules. The aforementioned physical mask layers are the layers which requests to insert dummy pattern as design rule.

The method may include the following step for the second dummy-inserted circuit layout: examining whether at least one of blocking, space, contact, straddle, and enclosure between auto inserted dummy pattern and at least one of a reference layer unit, border layer unit, and an initial dummy layer pattern element of the initial dummy layer unit in the second dummy-inserted circuit layout violates any of the set of circuit layout design rules, the set of dummy pattern check rules; and examining whether a physical mask layer density, which combines the drawing pattern of the mask layer and the auto-inserted dummy pattern in the mask layer, violates any of the pattern density rules of the mask layer.

Embodiments of the invention may be related to a device for implementing the aforementioned method.

An embodiment of the invention may be related to a device for examining quality of a dummy pattern insertion program. The device may include the following elements: first code (e.g., computer-readable code) configured to use the dummy pattern insertion program to generate a dummy-based circuit layout; second code configured to determine whether the dummy-based circuit layout complies with a set of circuit layout design rules; third code configured to use the dummy pattern insertion program to generate a first dummy-inserted circuit layout; fourth code configured to check whether the first dummy-inserted circuit layout complies with at least one of a set of dummy pattern check rules and a set of pattern density rules; fifth code configured to use the dummy pattern insertion program to generate a second dummy-inserted circuit layout; sixth code configured to examine whether the second dummy-inserted circuit layout complies with at least one of the set of circuit layout design rules, the set of dummy pattern check rules, and the set of pattern density rules; and a non-transitory data-storage member including hardware and configured to store at least one of the first code, the second code, the third code, the fourth code, the fifth code, and the sixth code.

The first code may use the dummy pattern insertion program to generate a first dummy pattern layout which includes one set of dummy pattern elements according to both a first circuit layout and a set of dummy pattern rules, may convert a data type of the first dummy pattern layout to generate the dummy-based circuit layout.

The third code may use the dummy pattern insertion program to insert the first dummy pattern layout into the first circuit layout to generate the first dummy-inserted circuit layout.

The fifth code may use the dummy pattern insertion program to generate a second dummy pattern layout which includes one set of dummy pattern elements according to both a relation-check circuit layout and the set of dummy pattern rules. The fifth code may use the dummy pattern insertion program to insert a second dummy pattern layout into the relation-check circuit layout to generate the second dummy-inserted circuit layout.

An embodiment of the invention may be related to a device for examining quality of a dummy pattern insertion program. The device may include a relation-check circuit layout that includes a set of reference layer units, a set of initial dummy layer units, and a border layer unit that encompasses both of the set of reference layer units and the set of initial dummy layer units. The device may further include a non-transitory data-storage member including hardware and configured to store data related to the relation-check circuit layout.

The set of reference layer units may include a first reference layer unit and a second reference layer unit. The set of initial dummy layer units may include a first initial dummy layer unit and a second initial dummy layer unit. The first reference layer unit may immediately neighbor a first edge of the border layer unit without any other reference layer unit being disposed between the first reference layer unit and the first edge of the border layer unit. The first initial dummy layer unit may immediately neighbor a second edge of the border layer unit without any other initial dummy layer unit being disposed between the first initial dummy layer unit and the second edge of the border layer unit. At least one of a length of a side of the first reference layer unit, a distance between the first reference layer unit and the second reference layer unit, a distance between the first reference layer unit and the first edge of the border layer unit, a length of a side of the first initial dummy layer unit, a distance between the first initial dummy layer unit and the second initial dummy layer unit, a distance between the first initial dummy layer unit and the second edge of the border layer unit, and a distance between the second reference layer unit and the second initial dummy layer unit may be in a range of 100 µm to 400 µm. In an embodiment, all of the above-mentioned lengths and distances may be in the range of 100 µm to 400 µm.

The above summary is related to one or more of many embodiments of the invention disclosed herein and is not intended to limit the scope of the invention.

BRIEF DESCRIPTION OF THE DRAWINGS

FIG. 6a, FIG. 6b, and FIG. 6c show schematic diagrams illustrating process steps in examining quality of a dummy pattern insertion program in accordance with an embodiment of the present invention.

DETAILED DESCRIPTION

Figure 1:
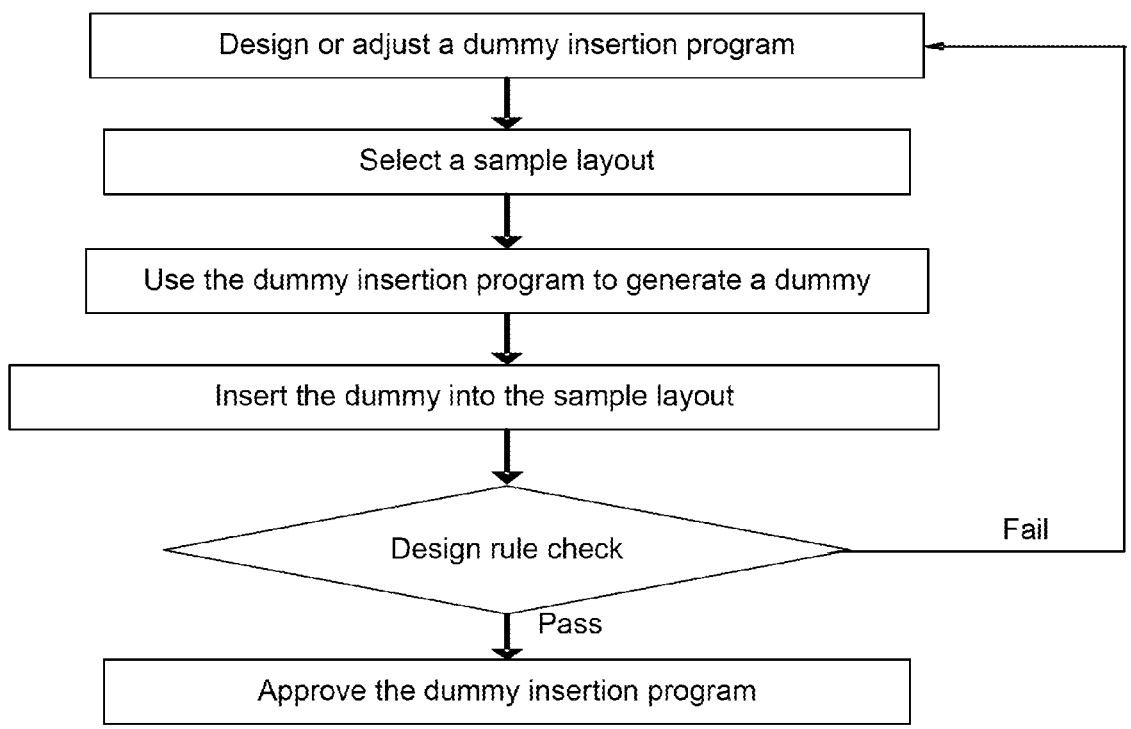
FIG. 1 shows a schematic flowchart illustrating a method for examining quality of a dummy pattern insertion program.

Example embodiments of the present invention are described with reference to the accompanying drawings. As those skilled in the art would realize, the described embodiments may be modified in various different ways, all without departing from the spirit or scope of the present invention. Embodiments of the present invention may be practiced without some or all of these specific details. Well known process steps and/or structures may not have been described in detail in order to not unnecessarily obscure the present invention.

The drawings and description are illustrative and not restrictive. Like reference numerals may designate like elements in the specification. Repetition of description may be avoided.

The relative sizes and thicknesses of elements shown in the drawings are for facilitate description and understanding, without limiting the present invention. In the drawings, the thicknesses of some layers, films, panels, regions, etc., may be exaggerated for clarity.

Illustrations of example embodiments in the figures may represent idealized illustrations. Variations from the shapes illustrated in the illustrations, as a result of, for example, manufacturing techniques and/or tolerances, may be possible. Thus, the example embodiments should not be construed as limited to the shapes or regions illustrated herein but are to include deviations in the shapes. For example, an etched region illustrated as a rectangle may have rounded or curved features. The shapes and regions illustrated in the figures are illustrative and should not limit the scope of the example embodiments.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

If a first element (such as a layer, film, region, or substrate) is referred to as being "on", "neighboring", "connected to", or "coupled with" a second element, then the first element can be directly on, directly neighboring, directly connected to, or directly coupled with the second element, or an intervening element may also be present between the first element and the second element. If a first element is referred to as being "directly on", "directly neighboring", "directly connected to", or "directed coupled with" a second element, then no intended intervening element (except environmental elements such as air) may also be present between the first element and the second element.

Spatially relative terms, such as "beneath", "below", "lower", "above", "upper", and the like, may be used herein for ease of description to describe one element or feature's spatial relationship to another element(s) or feature(s) as illustrated in the figures. It will be understood that the spatially relative terms may encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein should be interpreted accordingly.

The terminology used herein is for the purpose of describing particular embodiments and is not intended to limit the invention. As used herein, the singular forms, "a", "an", and "the" may indicate plural forms as well, unless the context clearly indicates otherwise. The terms "includes" and/or "including", when used in this specification, may specify the presence of stated features, integers, steps, operations, elements, and/or components, but may not preclude the presence or addition of one or more other features, integers, steps, operations, elements, components, and/or groups.

Unless otherwise defined, terms (including technical and scientific terms) used herein have the same meanings as commonly understood by one of ordinary skill in the art related to this invention. Terms, such as those defined in commonly used dictionaries, should be interpreted as having meanings that are consistent with their meanings in the context of the relevant art and should not be interpreted in an idealized or overly formal sense unless expressly so defined herein.

The term "connect" may mean "electrically connect". The term "insulate" may mean "electrically insulate".

Unless explicitly described to the contrary, the word "comprise" and variations such as "comprises", "comprising", "include", or "including" may imply the inclusion of stated elements but not the exclusion of other elements. A set of elements may mean one or more elements.

Various embodiments, including methods and techniques, are described in this disclosure. Embodiments of the invention may also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 2:
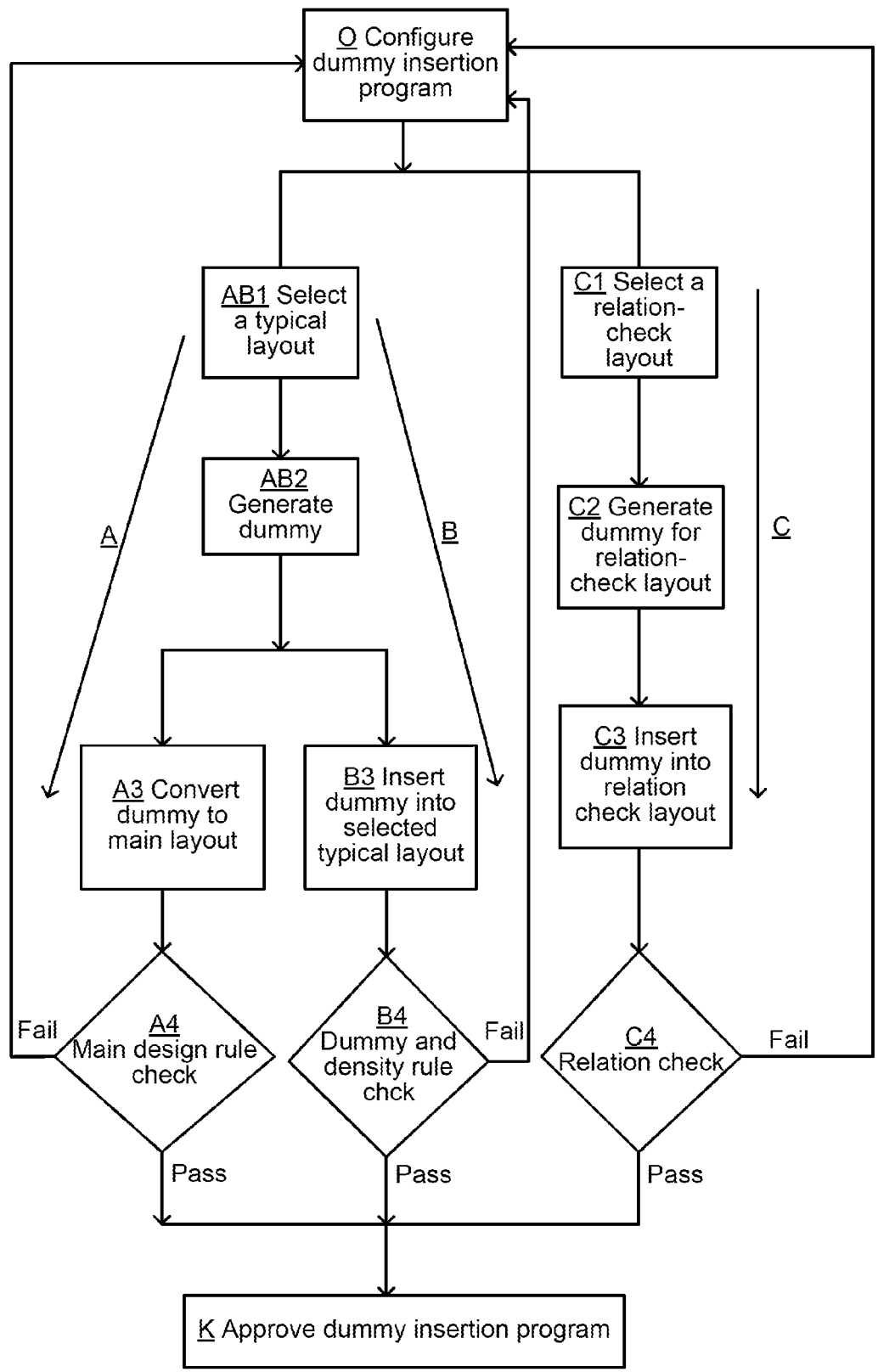
FIG. 2 shows a schematic flowchart illustrating a method for examining quality of a dummy pattern insertion program in accordance with an embodiment of the present invention.

FIG. 2 shows a schematic flowchart illustrating a method for examining quality of an automatic dummy pattern insertion program (or script) in accordance with an embodiment of the present invention. The method may advantageously prevent dummy pattern design from violating main design rules, such that issues related to violation of the main design rules in a manufacturing process may be prevented. Additionally or alternatively, the method may advantageously prevent unwanted contact between a dummy pattern and a reference layer, such that unwanted electrical coupling and related device defect or damage may be prevented.

Referring to FIG. 2, the method may include Step O, configuring an automatic dummy pattern insertion program (or script), and may include the following processes: Process A, determining whether a dummy pattern design sufficiently complies with a set of circuit layout main design rules; Process B, checking whether a dummy-inserted circuit layout complies with a set of dummy check rules and a set of density rules; and Process C, examining relation(s) between a set of dummy patterns and a set of reference drawing layers.

In Process A, characters of a design of a set of dummy patterns may be checked according to the set of main design rules. For example, whether a width, a length, and a space of a dummy pattern comply with the set of main design rules may be determined. The main design rules may be design rules of a typical drawing layout. If the dummy pattern(s) violate the main design rule(s), then the reason(s) for the violation may be reviewed. If the violation is based on one or more (predetermined) special considerations, then the violation may be acceptable. If the violation is unexpected or is not based on any special considerations, then the dummy pattern(s) and/or the dummy pattern insertion program may need to be adjusted, such the manufacturing yield of semiconductor devices may not be substantially compromised.

In Process A, the dummy pattern insertion program (or script) may generate the set of dummy patterns (including one or more dummy patterns) for forming a dummy pattern layout. The dummy pattern layout (having a first data type) may be converted into a main circuit drawing layout (having a second data type). The resulted main circuit drawing layout may be examined using the main design rule(s).

In process B, the dummy pattern insertion program may insert the dummy pattern(s) into an original layout to form a dummy-inserted layout, and whether the dummy-inserted circuit layout complies with the set of dummy pattern check rules may be examined. For example, whether one or more inserted dummy patterns contacts one or more drawing layers may be determined. If an inserted dummy pattern contacts a drawing layer, then the dummy-inserted layout, the inserted dummy pattern(s), and/or the dummy pattern insertion program (or algorithm) may violate the dummy check rule(s). If no inserted dummy pattern contacts any drawing layer, then the dummy-inserted layout, the inserted dummy pattern(s), and/or the dummy pattern insertion algorithm may be deemed compliant with the dummy pattern check rule(s). As another example, whether the inserted dummy patterns comply with special dummy size requirements may be examined.

In Process B, whether the dummy-inserted circuit layout complies with the set of density rules may be examined. If the dummy-inserted circuit layout complies with the density rule(s), then the dummy-inserted layout, the inserted dummy pattern(s), and/or the dummy pattern insertion program (or algorithm) may be deemed acceptable. If the dummy-inserted circuit layout violates the density rule(s), then the reason(s) for the violation may be reviewed. If the violation is based on one or more (predetermined) special considerations, then the violation may be acceptable. If the violation is unexpected or is not based on special considerations, then the dummy pattern and/or the dummy pattern insertion program may need to be adjusted.

In Process C, relation(s) between the dummy pattern(s) and the reference drawing layers may be examined. For example, whether the dummy pattern design rule(s) and/or design algorithm(s) are consistent with a set of reference layer design rules may be examined. As another example, whether the dummy pattern insertion rule(s), or insertion algorithm(s), are consistent with the set of reference drawing layer design rules may be examined. In Process C, comprehensive reference drawing layers pertaining to comprehensive design rules may be provided.

According to embodiments of the invention, the Processes A, B, and C may enable substantially comprehensive and accurate examination of the dummy pattern and/or the dummy pattern insertion program. Advantageously, satisfactory manufacturing yield may be resulted.

Referring to FIG. 2, Process A may include Steps AB1, AB2, A3, and A4.

In Step AB1, a typical circuit drawing layout may be selected as a selected circuit drawing layout. The selected circuit drawing layout may be in the Graphic Database System (GDS) format and may include one or more patterns.

In Step AB2, the dummy pattern insertion program (or script) may generate a first set of dummy patterns (including one or more first-type dummy patterns) according to the selected drawing layout and according to a set of dummy pattern rules. In an embodiment, the first-type dummy pattern(s) may be generated according to a graphical environment of the selected drawing layout. A first dummy pattern layout may be formed using the first-type dummy pattern(s).

In Step A3, the data type of the first dummy pattern layout may be changed for converting the first dummy pattern layout into a dummy-based main circuit drawing layout. In an embodiment, the data type of the first dummy pattern layout may be converted from (1; 7; 51; 57) to (0), such that the first dummy pattern layout may be converted into a dummy-based main circuit drawing layout. Since the dummy-based main circuit drawing layout has the data type of a main circuit drawing layout, the dummy-based main circuit drawing layout may be examined using the set of main design rules, which is configured for examining main circuit drawing layouts (or data having the data type of a main circuit drawing layout).

The application of the dummy pattern rules, generation of the first-type dummy pattern(s), and/or formation of the first dummy pattern layout in Steps AB1, AB2, and A3 may be computation and/or simulation processes without requiring physical layout fabrication or manufacturing. Therefore, designs for optimizing the device manufacturing yield may be implemented before actual manufacturing without incurring substantial cost.

In Step A4, the dummy-based main circuit drawing layout may be examined according to the set of main design rules. One or more of widths, lengths, spaces (or distances), areas, etc. of one or more of the first-type dummy patterns in one or more drawing layers, e.g., in a drawing layer, may be examined according to the main design rules. One or more of enclosure, overlap, straddle, butting, intersection, interaction, run length (or parallel length), and extension of one or more of the first-type dummy patterns in one or more drawing layers, e.g., in different drawing layers, may be examined according to the main design rules. One or more other characteristics of one or more of the dummy patterns in one or more drawing layers may be examined according to the main design rules.

If the first-type dummy patterns comply with the main design rules, the first-type dummy patterns and/or the dummy pattern insertion program may be deemed to pass the main design rule check. If the first-type dummy patterns violate the main design rules, then the reason(s) for the violation may be reviewed. If the violation is based on one or more special considerations, then the violation may be acceptable, and the first-type dummy pattern(s) and/or the dummy pattern insertion program may be deemed to pass the main design rule check. If the violation is unexpected or is not based on any special considerations, then the first-type dummy pattern(s) and/or the dummy pattern insertion program may need to be adjusted (through further performing Step O), such the manufacturing yield of semiconductor devices may not be substantially compromised.

Process B may include Steps AB1, AB2, B3, and B4. Steps AB1 and AB2 may also be performed in Process A and have been discussed above. In an embodiment, Process B may include one or more steps for generating dummy patterns and/or a dummy pattern layout that may be different from one or more of Steps AB1 and AB2.

In Step B3, the dummy pattern insertion program may be used to insert the first dummy pattern layout into the selected circuit drawing layout for forming a first combined layout, or first dummy-inserted circuit layout. The original drawing layout may include one or more patterns of the typical drawing layout.

In Step B4, the first dummy-inserted circuit layout may be examined according to the set of dummy pattern check rules and the set of pattern density rules. For example, whether one or more of the inserted first-type dummy patterns contacts one or more drawing layers may be determined. If an inserted first-type dummy pattern contacts a drawing layer, then the first dummy-inserted layout, the inserted first-type dummy pattern(s), and/or the dummy pattern insertion program (or algorithm) may violate the dummy check rule(s), and the dummy pattern insertion program may need to be adjusted, for example, to adjust the insertion algorithm (through further performing Step O). If no inserted first-type dummy pattern contacts any drawing layer, then the first dummy-inserted layout, the inserted first-type dummy pattern(s), and/or the dummy pattern insertion algorithm may be deemed compliant with the dummy pattern check rule(s). As another example, whether the inserted first-type dummy patterns comply with special dummy size requirements may be examined.

Additionally or alternatively, whether the first dummy-inserted circuit layout complies with the pattern density rule(s) may be examined. If the first dummy-inserted circuit layout complies with the density rule(s), then the first dummy-inserted layout, the inserted dummy pattern(s), and/or the dummy pattern insertion program (or algorithm) may be deemed acceptable. If the first dummy-inserted circuit layout violates the density rule(s), then the reason(s) for the violation may be reviewed. If the violation is based on one or more special considerations, then the violation may be acceptable. If the violation is unexpected or is not based on any special considerations, then the dummy pattern and/or the dummy pattern insertion program may need to be adjusted (through further performing Step O).

In an embodiment, as long as either one of the dummy pattern check rule(s) and the density rule(s) is violated, the dummy pattern insertion program may need to be adjusted (through further performing Step O).

Process C may include Steps C1, C2, C3, and C4.

In Step C1, a relation-check layout for examining relations between the automatically inserted dummy patterns and the reference drawing layers may be selected. The relation-check layout may include comprehensive reference drawing patterns, such that the examination may be comprehensive.

In Step C2, the dummy pattern insertion program (or script) may generate a second set of dummy patterns (including one or more second-type dummy patterns) according to the selected relation-check layout and according to a set of dummy pattern rules. In an embodiment, the second-type dummy pattern(s) may be generated according to a graphical environment of the selected relation-check layout. A second dummy pattern layout may be formed using the second-type dummy pattern(s).

In Step C3, the dummy pattern insertion program may be used to insert the second dummy pattern layout into the relation-check layout for forming a second combined layout, or second dummy-inserted layout.

In Step C4, the second dummy-inserted circuit layout may be examined according to the set of main design rules, the set of dummy pattern check rules, and the set of pattern density rules. Step C4 may include steps that may be analogous to a combination of the main design rule check in Step A4 and the dummy pattern check rule examination and pattern density rule examination in Step B4. Step C4 may include examining the second dummy-inserted layout, the second-type dummy patterns, and/or the insertion of the second dummy pattern layout according to the set of reference drawing layer design rules. If the second-dummy inserted layout complies with all of the required rules, then the dummy pattern insertion program may be deemed to pass the relation check. If the second-dummy inserted layout violates any of the required rules, then the reasons for the violation may be reviewed. If the violation is acceptable, then the dummy pattern insertion program may be deemed to pass the relation check. If the violation is unacceptable, then the dummy pattern insertion program may need to be adjusted (through further performing Step O).

In an embodiment, if the result of any of the Process A, Process B, and Process C is unacceptable, then the dummy pattern insertion program may need to be adjusted (through further performing Step O). If the results of all of the Process A, Process B, and Process C are acceptable, then the dummy pattern insertion program may be approved in Step K and may be used in semiconductor device layout design.

The method may be implemented using hardware that may include an electrical/electronic component and/or a non-transitory data-storage device.

Figure 3A:
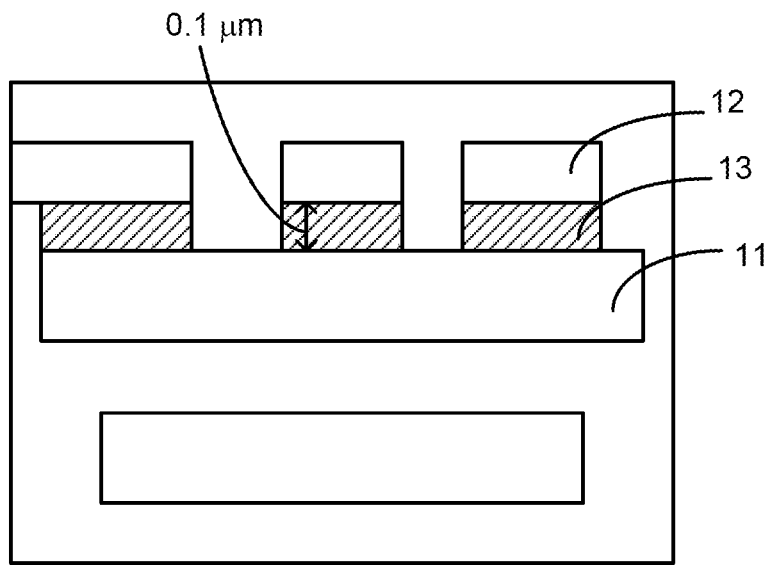
FIG. 3a and FIG. 3b show schematic diagrams illustrating process steps of examining quality of a dummy pattern insertion program in accordance with an embodiment of the present invention.

FIG. 3a shows a schematic diagram illustrating a dummy-based main circuit drawing layout in Process A for examining quality of a dummy pattern insertion program in accordance with an embodiment of the present invention. In the dummy-based main circuit drawing layout, the distance between a first metal element 11 and a second metal element 12 in a dummy pattern is 0.1 μm. Nevertheless, the main design rules require that the distance should be greater than 0.15 μm. In Process A, a design-rule-check error marker 13 may indicate the location associated with the violation of the main design rules. Referring to FIG. 2, Step O may be further performed to adjust the dummy pattern insertion program. According to the adjusted dummy pattern program, a re-designed dummy pattern may have a distance between the metal elements 11 and 12 that is greater than 0.15 μm and may comply with the main design rules.

Figure 3B:
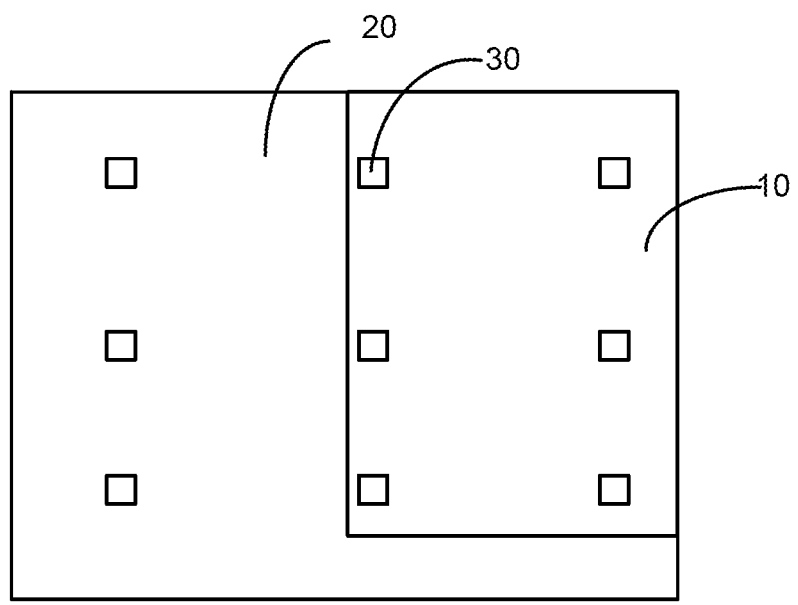

FIG. 3b shows a schematic diagram illustrating a dummy-inserted circuit layout in Process C for examining quality of a dummy pattern insertion program in accordance with an embodiment of the present invention. The dummy-inserted circuit layout includes a reference drawing layer 10, a dummy-permissible space 20, and dummy patterns 30 inserted in both the reference drawing layer 10 and the dummy-permissible space 20. Nevertheless, the dummy pattern check rules may forbid insertion of any dummy pattern 30 in the reference drawing layer 10. Therefore, Process C may indicate that the dummy-inserted circuit layout violates the dummy pattern check rules. Accordingly, referring to FIG. 2, Step O may be further performed to adjust the dummy pattern insertion program. For example, a requirement for the spacing between the dummy pattern 30 and the reference layer 10 may be further configured. According to the adjusted dummy pattern program, designed dummy patterns may not be inserted in the reference drawing layer 10 and may comply with the dummy pattern check rules.

According to embodiments of the invention, dummy patter design itself, a dummy-inserted layout, and relations between dummy patterns and reference drawing layers may be examined according to suitable rules. Accordingly, embodiments of the invention may substantially comprehensively and accurately examine the quality of a dummy pattern insertion program. Therefore, embodiments of the invention may prevent dummy pattern design from violating main design rules, such that issues related to violation of the main design rules in a manufacturing process may be prevented. Additionally or alternatively, embodiments of the invention may prevent unwanted or undesirable contact between a dummy pattern and a reference layer, such that unwanted electrical coupling and related device defect or damage may be prevented. Advantageously, embodiments of the invention may contribute to a satisfactory manufacturing yield.

Figure 4:
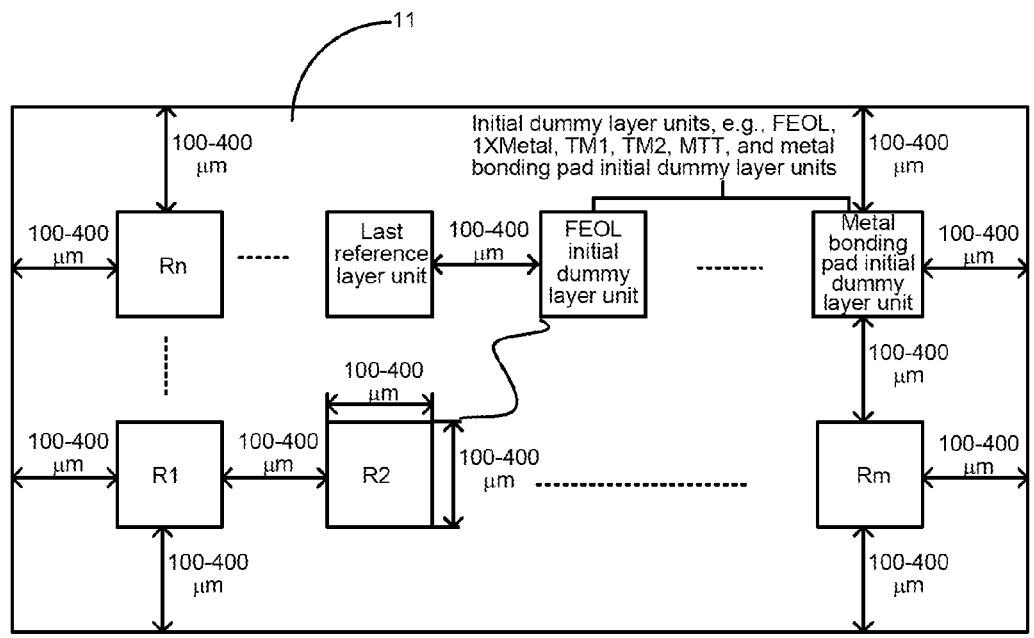
FIG. 4 shows a schematic diagram illustrating a layout structure for use in examining quality of a dummy pattern insertion program in accordance with an embodiment of the present invention.

FIG. 4 shows a schematic diagram illustrating a relation-check layout structure for use in examining quality of a dummy pattern insertion program in accordance with an embodiment of the present invention. The relation-check layout structure may be used in Process C discussed with reference to FIG. 2.

The relation-check layout structure may include a border layer unit 11 (or boundary layer unit 11), substantially all available (or conventional) reference layer units, and substantially all available initial dummy layer units. The aforementioned elements may be rectangular block regions. For a border layer unit and reference layer units, the units may be totally covered and/or encompassed by the corresponding drawing layers—border layer, and/or reference layers. For a set of initial dummy layer units, the initial dummy patterns of one dummy layer may be filled into to the corresponding dummy layer unit region. The border layer unit 11 may have relatively large critical dimensions, such that the border layer unit 11 may enclose and/or encompass substantially the available reference layer units and the all initial dummy layer units. The reference layers may be used for examining compliance of dummy pattern check rules and dummy pattern insertion rules. The reference layer units may include reference layer units R1, R2, Rm, Rn, the last reference layer unit, etc. The reference layer units may be arranged according to assigned identification numbers. Additionally or alternatively, the reference layer units may be arranged according to their critical dimension sizes.

Each of the reference layer units may be a rectangular block region totally covered and/or encompassed by the corresponding reference layer. The critical dimension of each side length of each rectangular reference layer unit may be in a range of 100 µm to 400 µm. The range of the critical dimension is determined based on the layout structure and should not be too large or too small. If the critical dimension of the reference layer unit is too large, then the examination of the relation between the dummy patterns and the reference layers (i.e., Process C discussed with reference to FIG. 2) may require too much time and/or resource, such that efficiency of the examination process may be undesirable or unacceptable. If the critical dimension of the reference layer unit is too small, then the reference layer relationship check may be ineffective. For example, if a reference layer unit is smaller than a particular type of dummy layer pattern that should be forbidden from being inserted in the reference layer unit, and if actually the dummy pattern insertion program has not been specifically configured to forbid the particular type of dummy layer pattern from being inserted, then insertion of the particular type of dummy layer pattern into the reference layer unit may be actually prevented by the smaller reference layer unit (rectangular shape) size/dimension, but not prevented by a suitable forbidding configuration of the dummy pattern insertion program. As a result, the dummy pattern insertion program may be incorrectly qualified, and examination of relations between dummy patterns and reference layers may be incorrectly deemed passed or qualified. Additionally or alternatively, the critical dimensions of the reference layer units may be configured based on consideration of the compatibility between the reference layer unit size and density check window sizes of various layers in design rules. The critical dimensions of the reference layer units should be at least bigger than the smallest density check window in design rules so that density check rules can highlight the pattern absence location in reference layer to help gate relationship between auto inserted dummy and reference layer. A critical dimension in the range of 100 µm to 400 µm may generally satisfy density check compatibility requirements for relevant layers. For one or more of these reasons, the critical dimensions of the reference layer units may need to be substantially precisely (and/or rigorously) configured and/or controlled.

Distances between immediately neighboring reference layer units may need to be substantially precisely (and/or rigorously) configured and/or controlled. A distance between (every) two immediately neighboring reference layer units may be in the range of 100 µm to 400 µm. If the distance is too small, for example, less than 100 µm, then the small space between the reference layers may undesirably prevent some dummy patterns from being automatically inserted. If the distance is too large, for example, greater than 400 µm, then the examination of the relation between the dummy patterns and the reference layers (i.e., Process C discussed with reference to FIG. 2) may require too much time and/or resource, such that efficiency of the examination process may be undesirable or unacceptable.

Distances between edges of the border layout element 11 and reference layer units that immediately neighbor the edges of the border layout element 11 may need to be substantially precisely (and/or rigorously) configured and/or controlled. A distance between an edge of the border layout element 11 and an immediately neighboring reference layer unit (which immediately neighbors the edge) may be in the range of 100 µm to 400 µm. If the distance is too small, for example, less than 100 µm, then the small space between elements may undesirably prevent some dummy patterns from being automatically inserted. If the distance is too large, for example, greater than 400 µm, then the examination of the relation between the dummy patterns and the reference layers (i.e., Process C discussed with reference to FIG. 2) may require too much time and/or resource, such that efficiency of the examination process may be undesirable or unacceptable.

The initial dummy layer units may correspond to various density request mask layers (e.g., active area layer, poly layer, inter-metal layers) to be used in the semiconductor manufacturing process. The initial dummy layer pattern may be manually drawn and/or may be auto-filled by the automatic dummy pattern insertion program into the corresponding dummy layer unit rectangular region. The initial dummy layer units may include one or more of a front-end-of-line process (FEOL) initial dummy layer unit, an inter-metal (1XMetal) initial dummy layer unit, a first top metal (TM1) initial dummy layer unit, a second top metal (TM2) initial dummy layer unit, an extra-thick metal (MTT) initial dummy layer unit, a metal bonding pad initial dummy layer unit, etc. The initial dummy layer units may be arranged in accordance with the above-mentioned sequence, arranged according to a different sequence, or randomly disposed. A distance between (every) two immediately neighboring ones of the initial dummy layer units may be in the range of 100 μm to 400 μm. A distance between an edge of the border layout element 11 and an immediately neighboring initial dummy layer unit (which immediately neighbors the edge) may be in the range of 100 μm to 400 μm. A distance between a reference layer unit (e.g., the layer Rm) and an initial dummy pattern layer element (e.g., the bonding pad layer) may be in the range of 100 μm to 400 μm. Accordingly, dummy patterns may be automatically inserted, and examination efficiency may be satisfactory.

The relation-check layout structure may enable automatic examination of relations between automatically inserted dummy patterns (which may be automatically inserted into the boarder layout element 11) and the reference layers based on main design rules, dummy pattern check rules, and pattern density rules. The relations may include one or more of blocking, space, contact (or touch), straddle, enclosure, etc. If any of the relations violates any of the rules, then the system that implements the method discussed with reference to FIG. 2 may provide a warning message and/or may indicate the violation.

Figure 5:
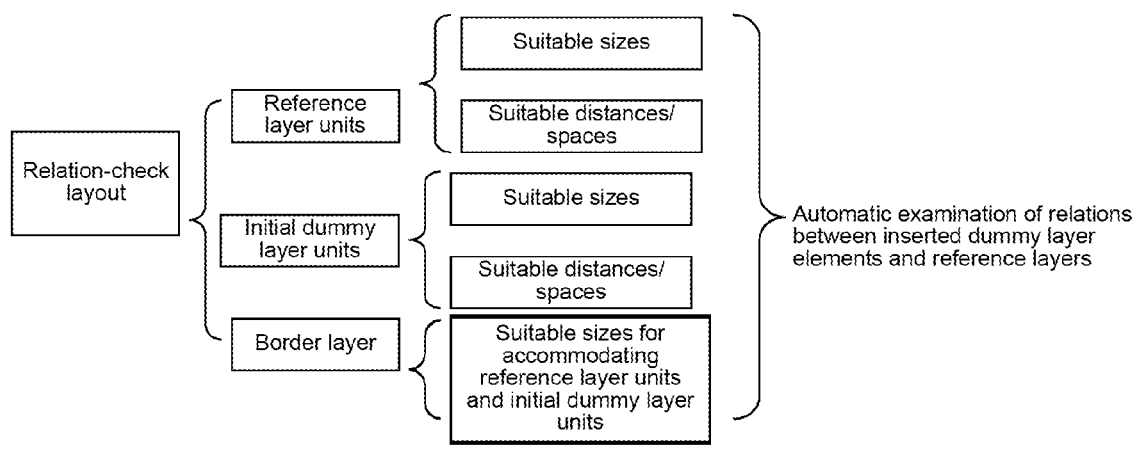
FIG. 5 shows a schematic diagram illustrating features of a layout structure for use in for examining quality of a dummy pattern insertion program in accordance with an embodiment of the present invention.

FIG. 5 shows a schematic diagram illustrating features of a relation-check layout structure for use in for examining quality of a dummy pattern insertion program in accordance with an embodiment of the present invention. As an example, the relation-check layout structure may represent the relation-check layout structure discussed with reference to FIG. 4.

The relation-check layout structure may include substantially all available (or conventional) reference layer units, substantially all suitable initial dummy layer units, and a border layer unit. The reference layer units may have suitable window (rectangular shape) sizes and suitable distances (i.e., spacing). The initial dummy layer units may have suitable window (rectangular shape) sizes/dimensions and suitable distances (i.e., spacing). The border layer unit may have a suitable size for accommodating (and/or encompassing) the reference layer units and the initial dummy pattern layer units. Advantageously, relations between auto inserted dummy patterns and the reference layers may be automatically examined using the relation-check layout.

The process discussed with reference to FIG. 3b may utilize a relation-check layout that may have one or more features discussed with reference to FIG. 4 and/or FIG. 5.

FIG. 6a shows a diagram illustrating process steps in examining quality of a dummy pattern insertion program in accordance with an embodiment of the present invention. FIG. 6b illustrates an enlarged view of a reference layer area illustrated in FIG. 6a. In the process steps, relations between dummy patterns and reference layers may be examined. The process discussed with reference to FIG. 6a and FIG. 6b may utilize a relation-check layout that may have one or more features discussed with reference to FIG. 4 and/or FIG. 5.

Referring to FIG. 6a, according to layout design rules, a reference layer 50 should prohibit insertion of an active region dummy pattern 60 and should allow insertion of a gate electrode dummy pattern 40. Nevertheless, as illustrated in FIG. 6b, the relation-check process, e.g., Step C4 discussed with reference to FIG. 2, may indicate that the reference layer 50 not only correctly prohibits insertion of an active region dummy pattern 60, but also incorrectly prohibits insertion of a gate electrode dummy pattern 40. As a result, the area associated with the reference layer 50 may have substantial empty space. Given the substantial empty space, the system that implements the examining method (including the relation-check process) may detect that gate pattern density rules have been violated and may thus provide a warning message (illustrated in FIG. 6b) and/or an indication of the violation.

In response to the warning message and/or violation indication, the system (and/or an operator of the system) may further configure the dummy pattern insertion program (e.g., in Step O discussed with reference to FIG. 2) to adjust or remove a requirement related to a space or distance between the reference layer 50 and a gate dummy pattern 40. As a result, a gate dummy pattern 40 may be inserted in the reference layer 50, such that the dummy-inserted circuit layout may comply with the pattern density rules.

FIG. 6c shows a diagram illustrating process steps in examining quality of a dummy pattern insertion program in accordance with an embodiment of the present invention. The process discussed with reference to FIG. 6c may utilize a relation-check layout that may have one or more features discussed with reference to FIG. 4 and/or FIG. 5.

Referring to FIG. 6c, according to layout design rules, an initial dummy layer pattern 80 may be prohibited from contacting an automatically inserted dummy pattern 70 that is located in the same layer as the initial dummy pattern layer. Nevertheless, as illustrated in FIG. 6c, the relation-check process, e.g., Step C4 discussed with reference to FIG. 2, may indicate that the automatically inserted dummy pattern 70 incorrectly contacts the initial dummy pattern layer 80 located in the same layer. As a result, the system that implements the examining method (including the relation-check process) may detect that dummy pattern check rules have been violated and may thus provide a warning message and/or an indication of the violation.

In response to the warning message and/or violation indication, the system (and/or an operator of the system) may further configure the dummy pattern insertion program (e.g., in Step O discussed with reference to FIG. 2) to adjust a requirement related to a space or distance between the automatically inserted dummy pattern 70 and the initial dummy layer pattern 80. As a result, the automatically inserted dummy pattern 70 may not contact the initial dummy layer pattern 80, such that the dummy-inserted circuit layout may comply with the dummy pattern check rules.

An embodiment of the invention may be a device for implementing one or more of the aforementioned process steps.

An embodiment of the invention may be a device for implementing one or more of the aforementioned relation-check layout structures.

As can be appreciated from the foregoing discussion, embodiments of the invention may prevent dummy pattern design from violating main design rules and/or may automatically adjust dummy pattern insertion program to comply with integrated circuit layout design rules, such that issues related to violation of the main design rules in a manufacturing process may be prevented. Additionally or alternatively, embodiments of the invention may prevent unwanted or undesirable contact between a dummy pattern and a reference layer, such that unwanted electrical coupling and related device defect or damage may be prevented. Advantageously, embodiments of the invention may contribute to a satisfactory manufacturing yield.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A method for manufacturing a semiconductor device, the method comprising:
   using a dummy pattern insertion program to generate a dummy-based circuit layout;
   determining whether the dummy-based circuit layout complies with a set of circuit layout design rules;
   using the dummy pattern insertion program to generate a first dummy-inserted circuit layout;
   checking whether the first dummy-inserted circuit layout complies with at least one of a set of dummy pattern check rules and a set of pattern density rules;
   using the dummy pattern insertion program to generate a second dummy-inserted circuit layout;
   examining whether the second dummy-inserted circuit layout complies with at least one of the set of circuit layout design rules, the set of dummy pattern check rules, and the set of pattern density rules;
   approving, using a device that includes hardware, the dummy pattern insertion program based on the determining, the checking, and the examining;
   generating a semiconductor device layout design using the dummy pattern insertion program; and
   manufacturing the semiconductor device using the semiconductor device layout design and a manufacturing apparatus.

2. The method of claim 1, comprising: checking whether the first dummy-inserted circuit layout complies with both of the set of dummy pattern check rules and the set of pattern density rules.

3. The method of claim 1, comprising: examining whether the second dummy-inserted circuit layout complies with all of the set of circuit layout design rules, the set of dummy pattern check rules, and the set of pattern density rules.

4. The method of claim 1, comprising:
   using the dummy pattern insertion program to generate a first dummy pattern layout according to at least one of a first circuit layout and a set of dummy pattern rules, wherein the first dummy pattern layout includes a first set of dummy layer elements; and
   converting a data type of the first dummy pattern layout to generate the dummy-based circuit layout.

5. The method of claim 4, comprising:
   using the dummy pattern insertion program to insert the first dummy pattern layout into at least one of the first circuit layout and a second circuit layout to generate the first dummy-inserted circuit layout.

6. The method of claim 5, comprising:
   using the dummy pattern insertion program to generate a second dummy pattern layout according to at least one of a relation-check circuit layout and the set of dummy pattern rules, wherein the second dummy pattern layout includes a second set of dummy layer elements; and
   using the dummy pattern insertion program to insert the second dummy pattern layout into the relation-check circuit layout to generate the second dummy-inserted circuit layout.

7. The method of claim 1, comprising:
   using the dummy pattern insertion program to generate a dummy pattern layout according to at least one of a relation-check circuit layout and the set of dummy pattern rules, wherein the dummy pattern layout includes a set of dummy layer elements; and
   using the dummy pattern insertion program to insert the dummy pattern layout into the relation-check circuit layout to generate the second dummy-inserted circuit layout.

8. The method of claim 1, comprising:
   using the dummy pattern insertion program to generate a first dummy pattern layout according to at least one of a first circuit layout and a set of dummy pattern rules; and
   using the dummy pattern insertion program to insert the first dummy pattern layout into at least one of the first circuit layout and a second circuit layout to generate the first dummy-inserted circuit layout.

9. The method of claim 8, comprising:
   using the dummy pattern insertion program to generate a second dummy pattern layout according to at least one of a relation-check circuit layout and the set of dummy pattern rules; and
   using the dummy pattern insertion program to insert the second dummy pattern layout into the relation-check circuit layout to generate the second dummy-inserted circuit layout.

10. The method of claim 1, comprising:
    using the dummy pattern insertion program to generate a set of dummy layer elements according to at least one of a relation-check circuit layout and a set of dummy pattern rules; and
    using the dummy pattern insertion program to insert the set of dummy layer elements into the relation-check circuit layout to generate the second dummy-inserted circuit layout.

11. The method of claim 10,
    wherein the relation-check circuit layout comprises a border layer unit, a set of reference layer units, and a set of initial dummy layer units, and
    wherein the border layer unit encompasses both of the set of reference layer units and the set of initial dummy layer units.

12. The method of claim 11,
    wherein the set of reference layer units includes a first reference layer unit and a second reference layer unit, and
    wherein the set of initial dummy layer units includes a first initial dummy layer unit and a second initial dummy layer unit,
    wherein the first reference layer unit immediately neighbors a first edge of the border layer unit without any other reference layer unit being disposed between the first reference layer unit and the first edge of the border layer unit,
    wherein the first initial dummy layer unit immediately neighbors a second edge of the border layer unit without any other initial dummy layer unit being disposed between the first initial dummy layer unit and the second edge of the border layer unit, and wherein at least one of a length of a side of the first reference layer unit, a distance between the first reference layer unit and the second reference layer unit, a distance between the first reference layer unit and the first edge of the border layer unit, a length of a side of the first initial dummy layer unit, a distance between the first initial dummy layer unit and the second initial dummy layer unit, a distance between the first initial dummy layer unit and the second edge of the border layer unit, and a distance between the second reference layer unit and the second initial dummy layer unit is in a range of 100 μm to 400 μm.

13. The method of claim 11, wherein the set of initial dummy layer units include at least one of a front-end-of-line process initial dummy layer unit, an inter-metal initial dummy layer unit, a first top metal initial dummy layer unit, a second top metal initial dummy layer unit, an extra-thick metal initial dummy layer unit, a metal bonding pad initial dummy layer unit.

14. The method of claim 1, comprising:
determining whether at least one of a width, a length, a distance, and an area related to at least one dummy layer element in a layer of the dummy-based circuit layout violates any of the circuit layout design rules; and
determining whether at least one of enclosure, overlap, straddle, butting, intersection, interaction, a parallel length, and extension of two or more dummy layer elements in different layers of the dummy-based circuit layout violates at least one of the circuit layout design rules.

15. The method of claim 1, comprising: examining whether at least one of blocking, space, contact, straddle, and enclosure related to at least one of a dummy layer element and a reference layer unit/ a initial dummy layer unit/ border layer unit in the second dummy-inserted circuit layout violates any of the set of circuit layout design rules, the set of dummy pattern check rules, and the set of pattern density rules.

16. A device for manufacturing a semiconductor device, the device comprising:
first code, which is configured to use a dummy pattern insertion program to generate a dummy-based circuit layout;
second code, which is configured to determine whether the dummy-based circuit layout complies with a set of circuit layout design rules;
third code, which is configured to use the dummy pattern insertion program to generate a first dummy-inserted circuit layout;
fourth code, which is configured to check whether the first dummy-inserted circuit layout complies with at least one of a set of dummy pattern check rules and a set of pattern density rules;
fifth code, which is configured to use the dummy pattern insertion program to generate a second dummy-inserted circuit layout;
sixth code, which is configured to examine whether the second dummy-inserted circuit layout complies with at least one of the set of circuit layout design rules, the set of dummy pattern check rules, and the set of pattern density rules;
seventh code, which is configured to approve the dummy pattern insertion program based on an output of the second code, an output of the fourth code, and an output of the sixth code;
eighth code, which is configured to generate a semiconductor device layout design using the dummy pattern insertion program;
a non-transitory data-storage member including hardware and configured to store at least one of the first code, the second code, the third code, the fourth code, the fifth code, the sixth code, the seventh code, and the eighth code; and
a manufacturing apparatus, which is configured to manufacture the semiconductor device using the semiconductor device layout design.

17. The device of claim 16,
wherein the first code is configured to use the dummy pattern insertion program to generate a first dummy pattern layout that includes a first set of dummy layer elements according to at least one of a first circuit layout and a set of dummy pattern rules, and configured to convert a data type of the first dummy pattern layout to generate the dummy-based circuit layout, and
wherein the fifth code is configured to use the dummy pattern insertion program to generate a second dummy pattern layout that includes a second set of dummy layer elements according to at least one of a relation-check circuit layout and the set of dummy pattern rules, the fifth code being further configured to use the dummy pattern insertion program to insert the second dummy pattern layout into the relation-check circuit layout to generate the second dummy-inserted circuit layout.

18. A device for manufacturing a semiconductor device, the device comprising:
a relation-check circuit layout that includes a set of reference layer units, a set of initial dummy layer units, and a border layer unit that encompasses both of the set of reference layer units and the set of initial dummy layer-units;
a dummy insertion program configured to generate a semiconductor device layout design;
an approval program configured to approve the dummy pattern insertion program using the relation-check circuit layout; and
a manufacturing apparatus configured to manufacture the semiconductor device using the semiconductor device layout design.

19. The device of claim 18,
wherein the set of reference layer units includes a first reference layer unit and a second reference layer unit, and
wherein the set of initial dummy layer units includes a first initial dummy layer unit and a second initial dummy layer unit,
wherein the first reference layer unit immediately neighbors a first edge of the border layer unit without any other reference layer unit being disposed between the first reference layer unit and the first edge of the border layer unit,
wherein the first initial dummy layer unit immediately neighbors a second edge of the border layer unit without any other initial dummy layer unit being disposed between the first initial dummy layer unit and the second edge of the border layer unit, and
wherein at least one of a length of a side of the first reference layer unit, a distance between the first reference layer unit and the second reference layer unit, a distance between the first reference layer unit and the first edge of the border layer unit, a length of a side of the first initial dummy layer unit, a distance between the first initial dummy layer unit and the second initial dummy layer unit, a distance between the first initial dummy layer unit and the second edge of the border layer unit, and a distance between the second reference layer unit and the second initial dummy layer unit is in a range of 100 μm to 400 μm.

* * * * *